73-4 SR
2/3/87 03 H 000,206

United States Statutory Invention Registration [19]

[11] Reg. Number: H206
[43] Published: Feb. 3, 1987

Newhall et al.

[54] DYNAMIC PRESSURE CALIBRATOR

[75] Inventors: Donald H. Newhall, Norfolk, Mass.; Arpad A. Juhasz, Joppa, Md.; Charles D. Bullock, Conowingo, Md.; James O. Pilcher, II, Edgewood, Md.

[73] Assignee: The United States of America as represented by the Secretary of the Army, Washington, D.C.

[21] Appl. No.: 835,857

[22] Filed: Feb. 10, 1986

[51] Int. Cl.[4] ..... G01L 27/00
[52] U.S. Cl. ..... 73/4 R

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

A high pressure, short rise time pulse is generated by first pressurizing a large chamber utilizing a pressure fluid. An initially closed channel communicates the large chamber with a small test chamber that is closed except for the channel and to which one or more pressure gauges are connected. One of the pressure gauges may be utilized as a standard to indicate pressure in the chamber while another one of the gauges can be calibrated utilizing the device. The channel is abruptly opened to discharge the high pressure fluid from the large chamber to the small test chamber. Only a small amount of fluid enters the small test chamber but the pressures in the large and small chamber are equalized rapidly so that the small chamber experiences a high pressure, short rise time pulse.

16 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DYNAMIC PRESSURE CALIBRATOR

STATEMENT OF GOVERNMENT INTEREST

The Government has rights in this invention pursuant to contract DAAK 11-79-C-0020 awarded by the Department of the Army.

FIELD AND BACKGROUND OF THE INVENTION

The present invention relates in general to ballistic pressure transducers or gauges, and in particular to a new and useful method and apparatus for the dynamic calibration of ballistic pressure transducers. According to the invention, large positive pressure pulses are generated which have very short rise times and which can be utilized for the dynamic calibration of ballistic pressure transducers or gauges. Pressure pulses are generated which are up to 150,000 lbs. per square inch with rise times of less than 600 microseconds.

Ballistic pressure gauges are routinely calibrated statically against deadweight pressure standards to obtain pressure vs. static response characteristics. The strength of this calibration technique is its traceability to primary pressure standards. The weakness of this technique however, is in the assumption that the static and dynamic responses of the gauge are identical. Any differences in gauge response between static (calibration) and dynamic (measurement) events will not appear utilizing this calibration technique. Dynamic calibration techniques are necessary to overcome this problem. The generation of precisely known high pressure pulses, however, is not a simple matter. Three general dynamic calibration techniques have been utilized.

The first of these is a negative going pressure step or pulse method. In this technique the gauge is exposed to a given pressure under static conditions using a hydraulic fluid. The gauge is then sealed off from the hydraulic system and its output is brought to zero. The pressure on the gauge is then relieved using a fast acting dump valve to bring the system to atmospheric pressure. The gauge output obtained during the depressurization is assumed to be the inverse of the corresponding positive pressure pulse or step.

Strengths of this technique include its relative simplicity and suitability to use in calibration facilities. The response of the negative step calibrator can be very quick, i.e. 100 microseconds or less. The major assumption, however, that the pressure response of the gauge is equal and opposite to the negative response of the gauge, is not completely accurate. Pressure preloading of the gauge to mount interface and hysteresis causes significant differences between the responses to pressurization and depressurization pulses.

Another technique utilizes a ballistic pulse. In this technique the gauge is mounted at the end of the tube, in contact with a hydraulic fluid confined by a movable piston. The tube guides a projectile which impacts the piston to create a positive pulse in the fluid. Different pressures may be achieved by varying the compressibility of the fluid, the mass of the piston, and the mass and velocity of the projectile. The pulses rise within milliseconds and mimic the characteristic rising and falling of a ballistic pressure pulse.

The ballistic pressure method is quite useful for dynamic comparison of several different pressure gauges. Variations in projectile velocity, frictional effects on the moving piston, and other energy losses make it difficult to accurately compute the actual delivered pressures. Because the projectile is fired during the calibration process, this method requires more extensive safety provisions than are readily available in most laboratories.

The final dynamic calibration technique utilizes a shock tube. Two general approaches are followed. In the first, the test gauge is mounted in the end wall of a closed tube and a shock wave is generated from the opposite end of the tube. The gauge output is monitored as the shock front arrives and stagnates at the end wall. In the second approach, the gauge is mounted in the side wall of the tube and its output is monitored as the shock front passes. Both methods generate rapidly rising pressure pulses that are readily calibrated using temperature and velocity measurements and gas properties.

Shock tube methods are being successfully used to establish the dynamic response characteristics of pressure gauges. Calibration however, is generally limited to pressures below 1,000 lbs. per square inch, whereas commercial applications required calibration up to 25,000 per square inch and defense applications up to 150,000 lbs. per square inch. Shock tubes also pose an acoustical hazard.

SUMMARY OF THE INVENTION

The inventive apparatus and method is capable of delivering to a pressure gauge, a precisely predictable repeatable, positive calibrated pressure step or pulse with a sub-millisecond rise time. The inventive device and method are safely operated in a laboratory. Direct analysis of the gauge response curve yields the required information for gauge dynamic response characteristics.

According to the invention, pressure pulses of up to 150,000 lbs. per square inch and rise times of less than 600 microseconds can be achieved. This exceeds the practical range of a shock tube technique and represents a rise time which is faster than those produced by the ballistic pulse method. The pressure and rise times achievable in the invention are comparable to those of modern guns to be tested utilizing a ballistic pressure gauge or transducer. The performance of the present invention is thus more than sufficient for calibrating the characteristics of such pressure gauges.

Accordingly, an object of the present invention is to provide a device and method for generating high pressure, short rise time pulses which comprises housing means defining a large pressure fluid chamber and a small pressure fluid chamber, a channel connected between and communicating said large and small pressure fluid chambers, valve means in said channel for opening and closing communications between said large and small pressure fluid chambers, a pressure line connected to said large pressure fluid chamber for pressurizing it with a hydraulic fluid, closure means connected to said small pressure fluid chamber for maintaining said small pressure fluid chamber in a closed condition at least when said valve means opens communication between the large and small chambers, and quick action means connected to said valve means for opening said valve means quickly to discharge pressurized fluid from said large pressure fluid chamber to said small pressure fluid chamber.

A still further object of the invention is to provide a method and apparatus which yields highly predictable results, the pressure step and rise being a function of the initial level of pressurization in the large chamber, system geometry, fluid bulk modulus and fluid viscosity. In a given system according to the invention, the relationship of initial operating pressure to the step pressure is readily determined by either theoretical calculations or direct measurement. The system may be measured directly using primary and secondary standard gauges attached to the large and small chambers. The system is controlled by establishing an initial state of pressure which is determined within 0.1% by a secondary standard gauge. The output pressure to the small chamber has been determined to be in agreement with the predicted pressure to within 0.2%. This is comparable to the results obtained with the negative pressure step method and superior to the results obtained with the ballistic pulse and shock tube methods mentioned above.

The system is readily calibrated because of its predictability and repeatability. In addition, comparison calibration against a standard gauge is facilitated by the existence of multiple gauge ports which communicate with the small pressure fluid chamber.

Since the invention is formed of a totally enclosed hydraulic system using water and ethylene glycol glycerin, or some other safe pressure medium, it does not pose a potential blast or acoustic hazard which is presented by ballistic pulse and shock tube methods. The system is safe to use in a laboratory without any special safety devices or facilities.

A further object of the invention is to provide a device for generatirng high pressure, short rise time pulses which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

The inventive device generates a known pressure step in a short time. This pressure is developed in a large reservoir and then discharged into a small sampling cavity by a quick-opening ball valve. Action time is minimized by restricting the mass transfer between the two cavities.

The inventive device generates a known pressure step in a short time. This pressure is developed in a large buffer reservoir and then discharged into a small sampling cavity by a quickopeningball valve. Action time is minimized by restricting the mass transfer between the two cavities.

Figure 1:
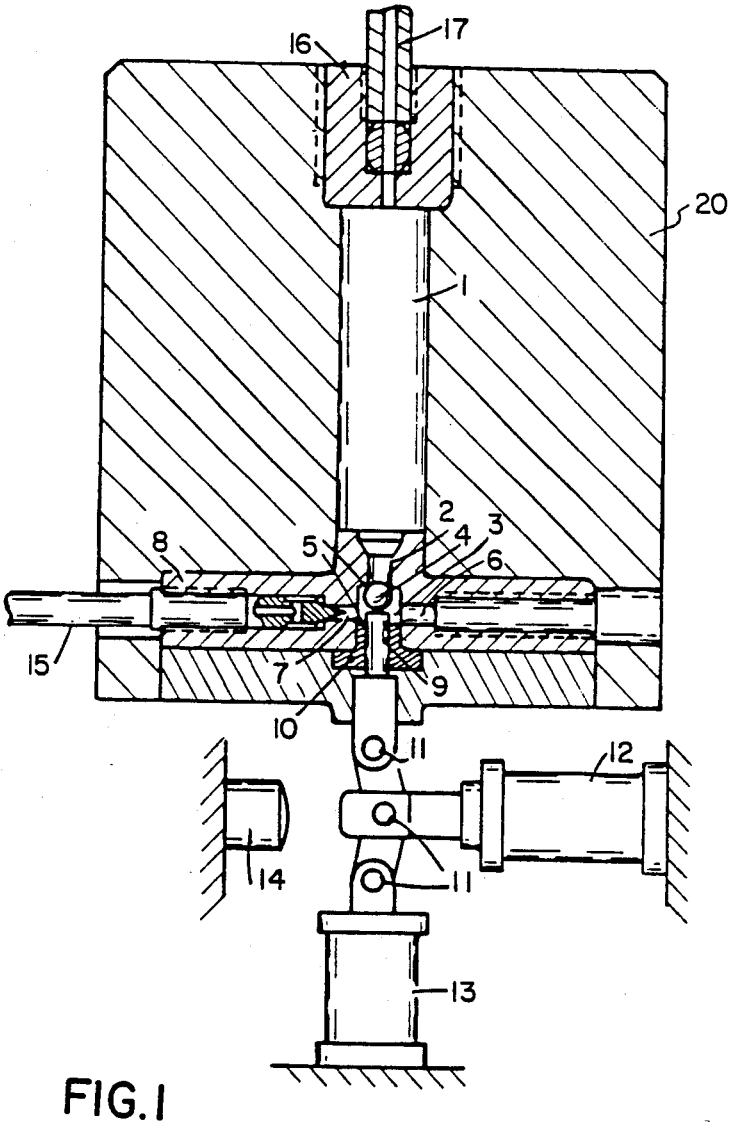
FIG. 1 is a side sectional view of the inventive device for generating high pressure, short rise time pulses.
Figure 2:
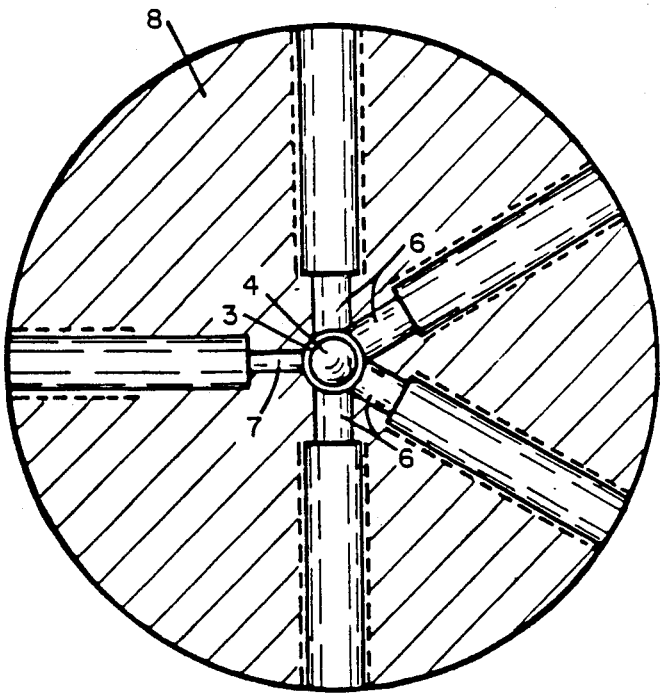
FIG. 2 is a transverse sectional view taken through a portion of the device shown in FIG. 1.

The invention, illustrated in FIG. 1 comprises a housing 20 which includes a large pressure reservoir or chamber 1 opening into a short wide channel 2 which terminates in a very small cylindrical test chamber 3. Located in the test chamber 3 is a ball valve 4 which provides a high pressure seal at either of two valve seats 5 located at each end of the test chamber 3. Located in the side wall of the test chamber 3 are four gauge ports 6 and one vacuum line port 7 (see FIG. 2). The channel 2, test chamber 3, gauge ports 6 and vacuum line port 7 are contained in a test head 8 which is connected in the housing 20. The test head 8 is a monolithic assembly shown in lateral cross section in FIG. 2. The test head 8 is readily removed from the housing, allowing changing of the gauge ports 6 and the test chamber 3. The ratio of the reservoir 1 volume to the test chamber 3 free volume is 197:1. The channel 2 is kept short and wide to minimize retardation of fluid flow during the operating cycle.

An end closure for the test chamber 3 is formed by a ball valve actuator piston 9 and a piston guide bushing 10. Bushing 10 also forms the lower valve seat 5. The piston 9 is actuated by a quick release top-dead-center mechanism which comprises three pin joints 11 connected to two levers 21, an air controlled trigger mechanism 12, a hydraulic jack 13 and a limit stop/buffer 14. The triggering mechanism 12 has a piston connected to the middle pin 11, which moves rapidly to the right in FIGS. 1 and 3 when mechanism 12 is triggered. The system shown in FIG. 1 is in the cocked position with the ball 4 pressed against the upper seat 5 that isolates the test chamber 3 from the reservoir 1. The jack 13 is pressurized to provide sufficient force to seal the reservoir 1 from the test chamber 3. The ratio of reservoir 1 pressure to jack 13 pressure is approximately 100:1.

A hollow stem valve 15 connected to a vacuum/drain line is located at port 7.

A high pressure line 17 is connected to a port 16 at the upper end of the reservoir 1. This line connects a pressure generation system (not shown) and a pressure measurement system (not shown) to the housing 20.

Figure 3:
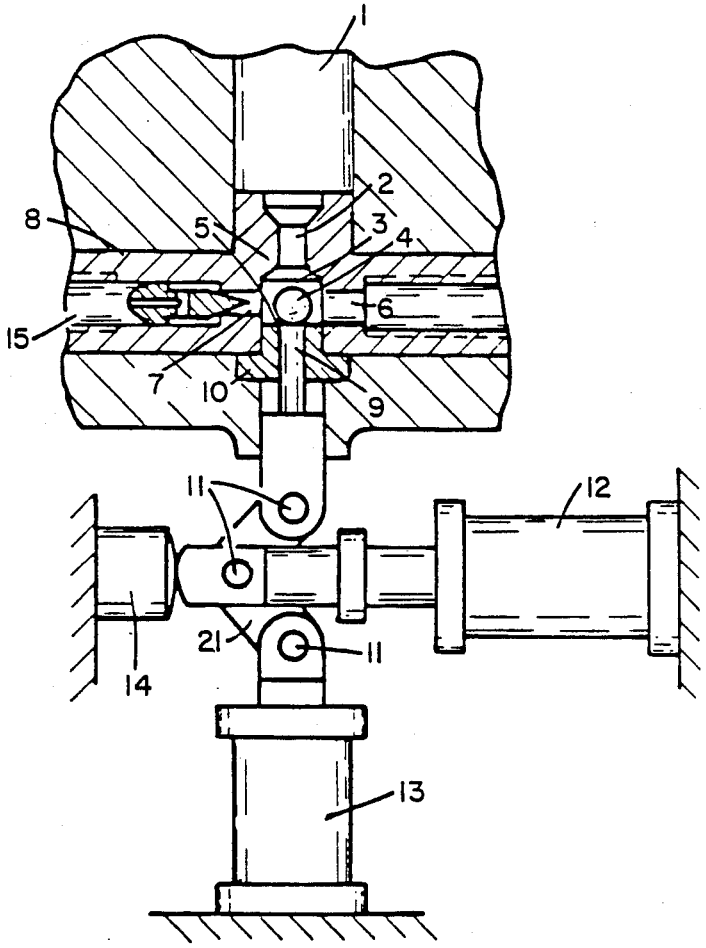
FIG. 3 is a partial view similar to FIG. 1 but on an enlarged scale.

FIG. 3 shows the invention after the trigger mechanism 12 is released. The trigger 12 forces the middle pin joint 11 against the limit stop/buffer 14, relaxes the force generated by the jack 12 and withdraws the ball valve actuator piston 9 into the piston guide bushing 10. Differential pressure between the reservoir 1 and the test chamber 3 forces the valve ball 4 against the lower seat 5 on the piston guide bushing 10 and allows fluid to flow from the reservoir 1 to the test chamber 3 causing the pressure in the chamber 3 to rise to approximately 98% of the original reservoir pressure.

The inventive device operates in the following way.

Starting with a drained system, the top-dead-center mechanism is placed in the release position as shown in FIG. 3. The high pressure line 17 is closed off and vacuum valve 15 is opened. This is done by moving the valve 15 to the left to open port 7. Gauges are mounted in the gauge ports 6. The system is evacuated over the vacuum/drain port 7 to a pressure of 2 Torr and the vacuum valve 15 is then closed. A 50% solution of water and glycol with a rust inhibitor enters the system through the high pressure line 17. When the system is filled and stabilized at atmospheric pressure, the top-dead-center mechanism is cocked as shown in FIG. 1. The hydraulic jack 13 is pressurized to approximately 1% of the desired reservoir pressure. Monitored by a primary or secondary gauge (not shown) the pressure generator system pressurizes the reservoir 1 over line 17. Once the desired reservoir pressure has been established, the high pressure line 17 is closed off from the standard gauge and the pressure generation system. The system is now ready to be triggered.

The test gauges and their associated recording system are triggered just prior to activation of the top-dead-center mechanism shown in FIG. 3. One gauge with exceptionally good response characteristics and known history is used as an informal laboratory standard. The output from this gauge is monitored for at least 10 seconds after the trigger event to observe system behavior, particularly possible pressure losses from leakage. The reservoir pressure is measured by the primary or secondary gauge one to two seconds after the system is triggered to determine the final value of the step pressure. The speed of the step can be measured using the time base of the recording system and the nature of the dynamic response can be checked against the response of a reliable gauge.

At the completion of the test, the top-dead-center mechanism is recocked, the test chamber 3 is drained through the vacuum valve 15, and the pressure is relaxed in the reservoir 1. The test gauges can now be replaced for further testing.

Figure 4:
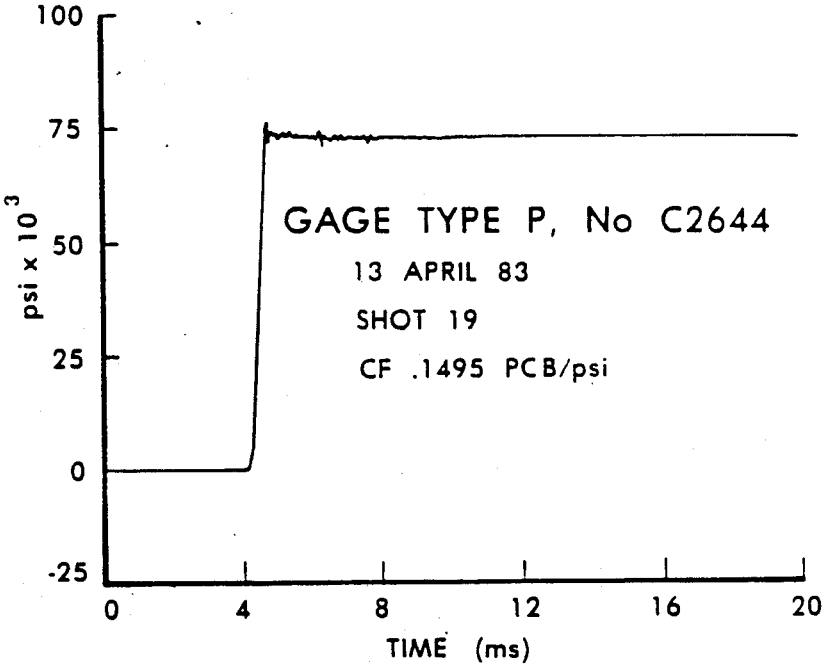
FIG. 4 is a graph relating pressure to time for an actual run conducted in accordance with the invention.
Figure 5:
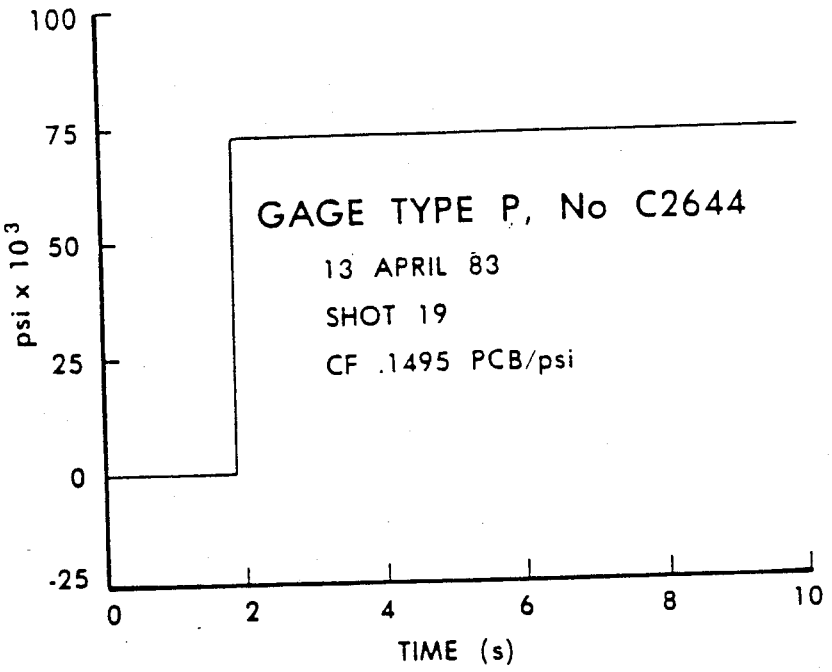
FIG. 5 is a view similar to FIG. 4 showing the pressure pulse on an enlarged time scale.
Figure 6:
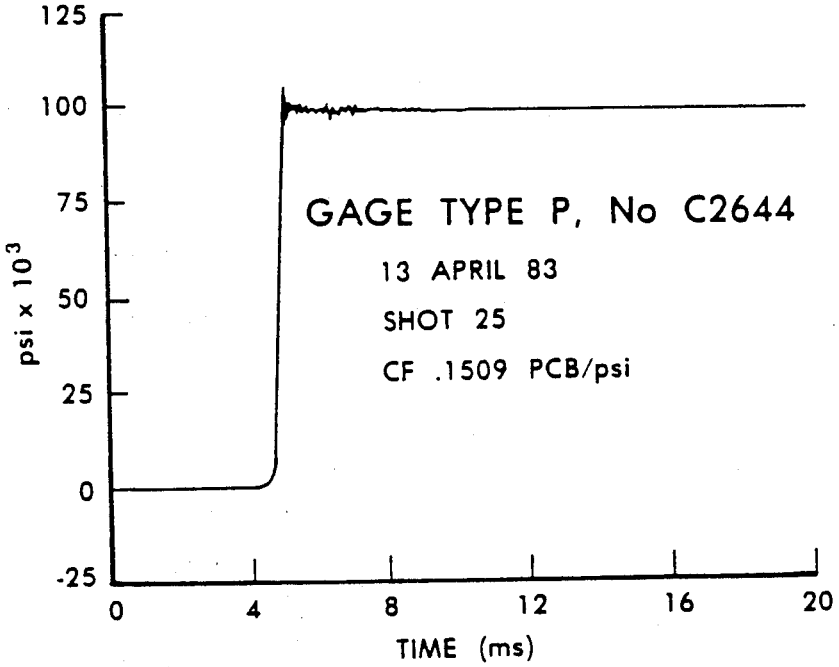
FIG. 6 is a view similar to FIG. 1 showing another run conducted in accordance with the invention.
Figure 7:
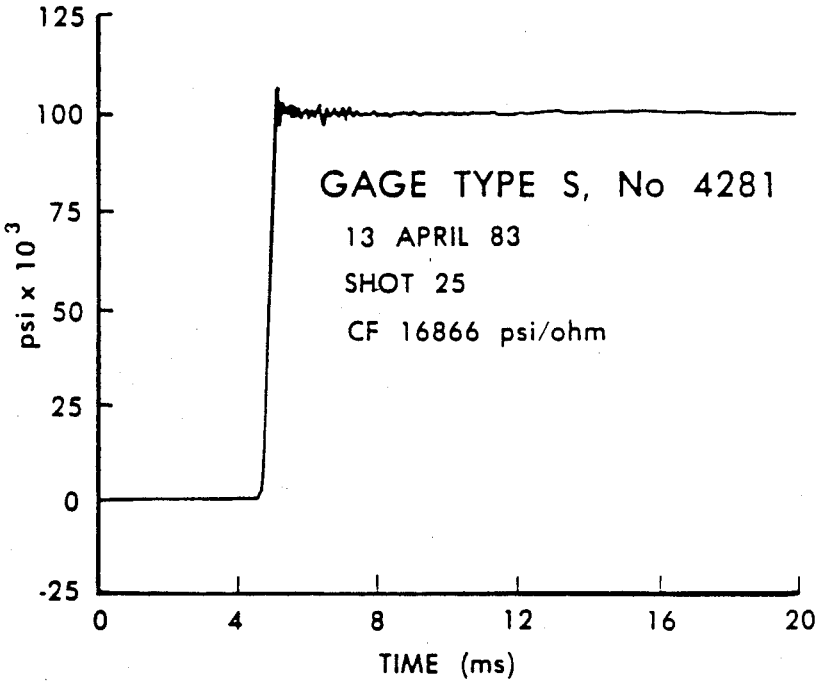
FIG. 7 is a view similar to FIG. 6 of still another run conducted in accordance with the invention.
Figure 8:
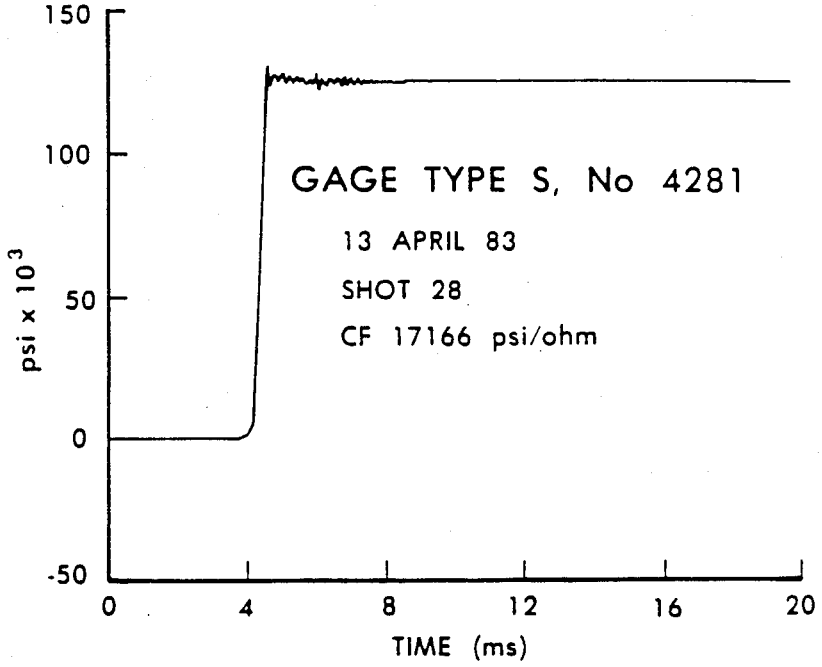
FIG. 8 is a view similar to FIG. 7 of a still further run conducted in accordance with the invention.

FIG. 4 shows a typical pressure versus time history for a 75,000 pounds per square inch pulse taken over 20 milliseconds. FIG. 5 shows the pressure versus time history of the same test pulse taken over 10 seconds. These histories were acquired from a high quality laboratory pressure gauge calibrated against a controlled clearance deadweight primary pressure standard, recorded on a calibrated transient recording digital oscilloscope. One important application of the step calibrator is the relative evaluation of different pressure gauges. FIGS. 6 and 7 show for a positive-going 100,000 lbs. per square inch pressure pulse, the pressure versus time histories of both a piezoelectric pressure gauge and a strain-type pressure gauge. FIG. 8 shows the pressure versus time history of a developmental pressure pulse. The step calibrator prototype has been successfully exercised from 25,000 pounds per square inch to 150,000 pounds per inch. The repeatability achieved is 0.8% and the predictability is 0.2%. The repeatability between gauge ports is less than 0.1% based on existing data.

The preceding description of the successful prototype of this invention uses a specific example that illustrates the principles of the device. Changes in the chamber ratio, addition of temperature sensors, the substitution of different valves make the invention useful in conducting other dynamic pressure tests. For example, the measurement of fundamental thermo-dynamic data such as adiabatic effects can be successfully achieved.

Compressed fluids, either gaseous or liquid, when contained at pressure, become energy reservoirs. The energy stored in the pressurized fluid contained in the large vessel 1 is transferred to the small vessel 3 upon actuation of the trigger 12. Pressure equilibrium between the vessels is rapidly established, where the exact time depends on the properties of the fluid and the relative volumes of the two chambers.

The use of a secondary pressure standard allows the user to accurately define the pressure history of a given system. Before the trigger is released, the initial pressures of both the large and small vessels are well known. The small vessel is at atmospheric pressure and the large vessel's pressure is measured with a primary or secondary standard. After the trigger is released the final pressures are the same and are determined using a primary or secondary pressure standard.

While a specific embodiment of the invention has been shown and described in detail to illustrate the application of the principles of the invention, it will be understood that the invention may be embodied otherwise without departing from such principles.

What is claimed is:

1. A device for generating high pressure, short rise time pulses, comprising:

housing means defining a large pressure chamber, a small pressure chamber and a channel communicating said large and small pressure chambers;

a high pressure line connected to said large pressure chamber for supplying a pressurized fluid to said large pressure chamber;

valve means movable in said housing means for closing said channel to permit pressurization of said large pressure chamber through said high pressure line, and for opening said channel for discharging high pressure fluid from said large pressure chamber to said small pressure chamber;

at least one gauge port connected to said small pressure chamber for communication between said small pressure chamber and pressure gauge to be exposed to pressure in said small pressure chamber; and closure means for closing said small pressure chamber except for communication with said at least one gauge port and said channel and at least when said valve means opens said channel for confining pressurized fluid entering said small pressure chamber from said large pressure chamber.

2. A device according to claim 1, wherein said valve means comprises a valve member movable into and out of engagement with said channel and a trigger mechanism engaged with said valve member for permitting rapid movement of said valve member away from said channel to open communication between said large and small pressure chambers.

3. A device according to claim 2, wherein said valve member comprises a ball movable in said small pressure chamber, said channel having a valve seat for engagement by said ball for closing communication between said channel and said small pressure chamber, and a top-dead-center mechanism connected between said trigger mechanism and said ball for pressing said ball against said valve seat to close said channel and for rapidly releasing said ball for movement away from said valve seat with triggering of said trigger mechanism.

4. A device according to claim 3, wherein said top-dead-center mechanism comprises a piston movable in said housing means and into said small pressure chamber into engagement against said ball, a pair of levers connected to each other at a middle lever pin, one lever being connected to said piston at an upper lever pin, a hydraulic jack having a piston connected to the other lever at a lower lever pin, said trigger mechanism having a piston engaged with said middle lever pin for holding said middle lever pin in a position to transmit force of said hydraulic jack piston to said piston which is movable in said housing means, said trigger mechanism activated to move its piston so that said middle lever pin is moved into a position releasing pressure of said hydraulic jack piston from said piston which is movable in said housing means to release said ball and open said valve seat.

5. A device according to claim 4, including a bushing fixed in said housing means and slidably receiving said piston which is movable in said housing means, said bushing defining a second valve seat communicating with said small pressure chamber and engageable by said ball, said first mentioned and second valve seats being spaced apart to permit movement of said ball away from said first mentioned seat and into engagement with said second valve seat with actuation of said trigger mechanism.

6. A device according to claim 5, including a vacuum port communicating with said small pressure chamber and a vacuum valve movable in said vacuum port for opening and closing said vacuum port to vent pressure fluid from said small pressure chamber.

7. A device according to claim 1, including a vacuum port communicating with said small pressure chamber and a vacuum valve movable in said vacuum port for opening and closing said vacuum port to vent pressure fluid from said small pressure chamber.

8. A device according to claim 1, including a plurality of gauge ports communicating with said small pressure chamber for establishing communication between said small pressure chamber and a plurality of pressure gauges.

9. A device according to claim 1, wherein said housing means includes a housing having a cavity defining said large pressure chamber and a further cavity, a removable head seated in said further cavity and containing a small pressure chamber, said channel and said at least one gauge port.

10. A method of generating high pressure, short rise time pulses, comprising:

pressurizing a large pressure chamber with a pressure fluid;

discharging the pressurized high pressure fluid from the large pressure chamber through a channel into a small pressure chamber having a volume which is a small fraction of the volume of said large pressure chamber;

confining the pressurized fluid coming from said large pressure chamber in said small pressure chamber to establish a rapid rise in pressure in said small pressure chamber to a point equaling the pressure initially established in said large pressure chamber; and communicating to a pressure gauge the pressure rise in said small pressure chamber.

11. A method according to claim 10, including evacuating said small pressure chamber to atmospheric pressure when said large pressure chamber is being pressurized and before communication is established between said large and small pressure chamber.

12. A method according to claim 11, including closing said channel using a valve member which is held against said channel to block communication between said large and small pressure chambers, holding said valve member using a hydraulic jack to exert a force on said valve member, and releasing the force on said valve member to establish communication between said large and small pressure chambers.

13. A method according to claim 12, wherein said large pressure chamber with said channel closed is pressurized to a pressure level which is 100 to 1 with respect to a pressure of said jack exerted against said valve member.

14. A method according to claim 10, including closing communication between said large and small pressure chambers by pressing a ball against a valve seat on said channel, and releasing said ball to permit it to move away from said valve seat and to establish communication between said large and small pressure chambers.

15. A method according to claim 14, including pressing said ball against said valve seat using a piston moving through a bushing, said bushing defining a second valve seat communicating with said small pressure chamber and withdrawing said piston to permit movement of said ball away from said first mentioned valve seat and into engagement with said second valve seat.

16. A method according to claim 10, including measuring a pressure in said large pressure chamber after it is pressurized with pressure fluid, connecting a standard pressure gauge to said small pressure chamber to be exposed to the pressure rise in said small pressure chamber, and connecting a pressure gauge to be calibrated to said small pressure chamber.

* * * * *